United States Patent
Xu et al.

(10) Patent No.: US 10,127,932 B2
(45) Date of Patent: *Nov. 13, 2018

(54) PERPENDICULAR MAGNETIC RECORDING MEDIUM AND MAGNETIC STORAGE APPARATUS

(71) Applicant: SHOWA DENKO K.K., Tokyo (JP)

(72) Inventors: Chen Xu, Chiba (JP); Gohei Kurokawa, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 15/088,341

(22) Filed: Apr. 1, 2016

(65) Prior Publication Data

US 2016/0351223 A1  Dec. 1, 2016

(30) Foreign Application Priority Data

May 29, 2015 (JP) .................. 2015-109506

(51) Int. Cl.
*G11B 5/66* (2006.01)
*G11B 5/127* (2006.01)
*G11B 5/73* (2006.01)

(52) U.S. Cl.
CPC .......... *G11B 5/1278* (2013.01); *G11B 5/7325* (2013.01)

(58) Field of Classification Search
CPC ............ G11B 5/73; G11B 5/732; G11B 5/738
See application file for complete search history.

(56) References Cited

U.S. PATENT DOCUMENTS

| 7,173,013 B2 | 2/2007 | Kolobov et al. |
| 7,183,013 B2 | 2/2007 | Oikawa et al. |
| 8,088,504 B2 | 1/2012 | Shimizu |
| 8,603,651 B2 | 12/2013 | Takahoshi et al. |
| 2003/0219630 A1* | 11/2003 | Moriwaki ............... G11B 5/65 428/836.2 |

(Continued)

FOREIGN PATENT DOCUMENTS

| JP | H01-263910 | 10/1989 |
| JP | H07-244831 | 9/1995 |

(Continued)

OTHER PUBLICATIONS

Office Action dated Feb. 23, 2018 issued with respect to the related U.S. Appl. No. 15/096,351.

*Primary Examiner* — Holly C Rickman
(74) *Attorney, Agent, or Firm* — IPUSA, PLLC

(57) ABSTRACT

A perpendicular magnetic recording medium includes a soft magnetic underlayer, an underlayer, an intermediate layer, and a perpendicular magnetic recording layer successively stacked on a nonmagnetic substrate. The soft magnetic underlayer includes a soft magnetic layer having an amorphous structure. The underlayer includes a first underlayer, and a second underlayer provided between the first underlayer and the intermediate layer. The first underlayer is made of a TiV alloy having an amorphous structure, and the second underlayer is made of an NiW alloy including at least one element selected from a group consisting of Co, Cu, Al, Cr, and Fe. The intermediate layer is made of Ru or an Ru alloy, and wherein the soft magnetic layer, the first underlayer, and the second underlayer are stacked in this order.

15 Claims, 1 Drawing Sheet

(56) References Cited

U.S. PATENT DOCUMENTS

2012/0154948 A1\* 6/2012 Tamai ................. G11B 5/65
360/75
2014/0342189 A1\* 11/2014 Tachibana ............. G11B 5/732
428/831

FOREIGN PATENT DOCUMENTS

| JP | 2003-123239 | 4/2003 |
| JP | 2004-227717 | 8/2004 |
| JP | 2007-179598 | 7/2007 |
| JP | 2007-272990 | 10/2007 |
| JP | 2010-092525 | 4/2010 |
| JP | 2012-069230 | 4/2012 |

\* cited by examiner

PERPENDICULAR MAGNETIC RECORDING MEDIUM AND MAGNETIC STORAGE APPARATUS

CROSS-REFERENCE TO RELATED APPLICATIONS

This application is based upon and claims the benefit of priority of the prior Japanese Patent Application No. 2015-109506 filed on May 29, 2015, the entire contents of which are incorporated herein by reference.

BACKGROUND OF THE INVENTION

1. Field of the Invention

The present invention relates to a perpendicular magnetic recording medium and a magnetic storage apparatus. The perpendicular magnetic recording medium may be used in an HDD (Hard Disk Drive) or the like.

2. Description of the Related Art

The in-plane magnetic recording system orients an axis of easy magnetization along an in-plane direction of a magnetic recording layer. On the other hand, the perpendicular magnetic recording system orients the axis of easy magnetization along a direction perpendicular to the in-plane direction of the magnetic recording layer. According to the perpendicular magnetic recording system, a demagnetization field becomes small in a vicinity of a magnetization transition region at a boundary between recording bits. Hence, the perpendicular magnetic recording medium becomes electrostatically stable as a recording density becomes higher, to thereby improve thermal stability. The perpendicular magnetic recording system is thus suited for improving the in-plane recording density.

The perpendicular magnetic recording medium includes a soft magnetic underlayer, an underlayer, an intermediate layer, and a perpendicular magnetic recording layer that are successively stacked on a nonmagnetic substrate. In a case in which the soft magnetic underlayer made of a soft magnetic material is provided between the nonmagnetic substrate and the perpendicular magnetic recording layer, the perpendicular magnetic recording medium functions as a so-called double-layered medium that can provide a high recording performance. In this case, the soft magnetic underlayer has a role of circulating a recording magnetic field from a magnetic head, to improve efficiency of the magnetic recording and reproduction.

The underlayer is a dominant element that determines a grain size and the crystal orientation of the intermediate layer and the perpendicular magnetic recording layer that are formed on the underlayer. A material selected for the underlayer is one of main factors determining the recording and reproducing performance of the perpendicular magnetic recording medium. Hence, various underlayer materials have been proposed. For example, Japanese Laid-Open Patent Publication No. 1-263910 proposes using a Ti alloy, and Japanese Laid-Open Patent Publication No. 2003-123239 proposes using an NiFeCr alloy. Materials having an hcp structure, an fcc structure, and an amorphous structure such as Ta have also been proposed for the underlayer. For example, Japanese Laid-Open Patent Publication No. 2010-092525 proposes an underlayer made of an alloy including one of Ni, Cu, Pt, and Pd as a main component thereof, and including one or more added elements selected from Ti, V, Ta, Cr, Mo, and W.

On the other hand, Japanese Laid-Open Patent Publication No. 7-244831 proposes using Ru for the intermediate layer, for example. Tops of columnar crystals of Ru have a dome shape, and crystal grains of the magnetic recording layer or the like can be grown on the dome-shaped tops of the columnar Ru crystals. Japanese Laid-Open Patent Publication No. 2007-272990 proposes promoting an isolation structure of the crystal grains grown on the dome-shaped tops of the columnar Ru crystals, and isolating the crystal grains, to grow magnetic grains in the columnar shape. In addition, Japanese Laid-Open Patent Publication No. 2012-069230 proposes an underlayer having a stacked structure made up of an alloy layer having an fcc structure, including an element having the fcc structure and an element having a bcc structure, and an NiW alloy layer. For example, Japanese Laid-Open Patent Publication No. 2004-227717 proposes using TiV for an underlayer of the magnetic recording medium having the in-plane orientation.

However, there are demands to further increase the recording density of the perpendicular magnetic recording medium.

Various perpendicular magnetic recording media and magnetic storage apparatuses using the perpendicular magnetic recording media have been proposed to satisfy such demands. According to some proposals, the underlayer is made of an NiW alloy, and the crystal grain size of the underlayer is reduced, in order to reduce the crystal grain size and improve the crystal orientation of the intermediate layer and the magnetic recording layer that are formed on the underlayer. These proposals can obtain a good electromagnetic conversion characteristic, and achieve the high recording density. Most of these proposals use a soft magnetic underlayer having an amorphous structure, and provides a microcrystal layer having an fcc structure between the soft magnetic underlayer and the NiW underlayer, in order to achieve microcrystallization of the NiW underlayer. However, the microcrystallization of the NiW underlayer may deteriorate the crystal orientation of the intermediate layer provided above the NiW underlayer.

SUMMARY OF THE INVENTION

Embodiments of the present invention may provide a perpendicular magnetic recording medium and a magnetic storage apparatus, having an underlayer made of an NiW alloy, capable of reducing a crystal grain size of the underlayer and improving a crystal orientation of the underlayer.

According to one aspect of the present invention, a perpendicular magnetic recording medium includes a soft magnetic underlayer, an underlayer, an intermediate layer, and a perpendicular magnetic recording layer successively stacked on a nonmagnetic substrate, wherein the soft magnetic underlayer includes a soft magnetic layer having an amorphous structure, wherein the underlayer includes a first underlayer, and a second underlayer provided between the first underlayer and the intermediate layer, wherein the first underlayer is made of a TiV alloy having an amorphous structure, wherein the second underlayer is made of an NiW alloy including at least one element selected from a group consisting of Co, Cu, Al, Cr, and Fe, wherein the intermediate layer is made of Ru or an Ru alloy, and wherein the soft magnetic layer, the first underlayer, and the second underlayer are stacked in this order.

According to another aspect of the present invention, a magnetic storage apparatus includes the perpendicular magnetic recording medium described above, and a magnetic head configured to read and write information with respect to the perpendicular magnetic layer of the perpendicular magnetic recording medium.

DESCRIPTION OF THE PREFERRED EMBODIMENTS

Figure 1:
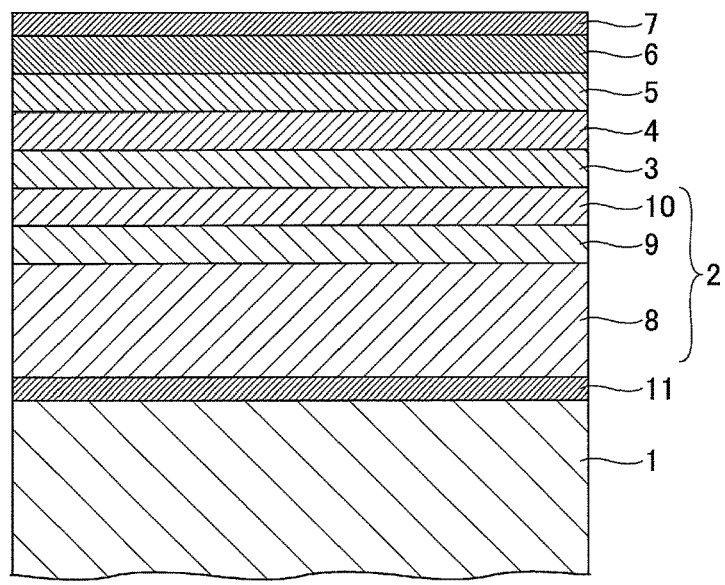
FIG. 1 is a cross sectional view illustrating an example of a perpendicular magnetic recording medium in one embodiment of the present invention.

A description will be given of embodiments and exemplary implementations of a perpendicular magnetic recording medium and a magnetic storage apparatus according to the present invention, by referring to the drawings.

In the drawings, constituent parts are not drawn to scale, and some constituent parts may be illustrated on an enlarged or reduced scale compared to other constituent parts. In other words, dimensions of constituent parts and size relationships of the constituent parts that are illustrated in the drawings do not indicate the actual dimensions and the actual size relationships. In addition, materials and dimensions of the constituent parts described below are examples, and the materials and the dimensions of the constituent parts are not limited to the described examples.

(Perpendicular Magnetic Recording Medium)

FIG. 1 is a cross sectional view illustrating an example of the perpendicular magnetic recording medium in one embodiment of the present invention. A perpendicular magnetic recording medium 50 illustrated in FIG. 1 includes a nonmagnetic substrate 1. A bonding layer 11, a soft magnetic underlayer 2, a first underlayer 3, a second underlayer 4, an intermediate layer 5, a perpendicular magnetic recording layer 6, and a protection layer 7 are successively stacked on both surfaces of the nonmagnetic substrate 1. For the sake of convenience, FIG. 1 only illustrates the layers provided on one of the two surfaces (that is, upper and lower surfaces) of the nonmagnetic substrate 1. A lubricant layer (not illustrated) is provided on the protection layer 7.

The nonmagnetic substrate 1 may be made of a Fmetal material, such as aluminum, aluminum alloys, or the like. In addition, the nonmagnetic substrate 1 may be made of a non-metal material, such as glass, ceramics, silicon, silicon carbide, carbon, or the like.

A glass substrate forming the nonmagnetic substrate 1 may be made of amorphous glass or crystalline glass. The amorphous glass may be general-purposes soda lime glass, aluminosilicate glass, or the like. On the other hand, the crystalline glass may be lithium crystalline glass, or the like.

When the nonmagnetic substrate 1 makes contact with the soft magnetic underlayer 2 that is made of a material having Co or Fe as a main component thereof as will be described later, corrosion of the nonmagnetic substrate 1 may progress due to absorption gas on a substrate surface, effects of moisture, diffusion of a substrate component, or the like. For this reason, the bonding layer 11 is preferably provided between the nonmagnetic substrate 1 and the soft magnetic underlayer 2. The bonding layer 11 may be made of a material selected from Cr, Cr alloys, Ti, Ti alloys, or the like, for example. The bonding layer 11 preferably has a thickness of 2 nm or greater, and more preferably 30 nm or greater.

The soft magnetic underlayer 2 has a structure including a first soft magnetic layer 8, an Ru layer 9, and a second soft magnetic layer 10 that are successively stacked in this order. In other words, the soft magnetic underlayer 2 has the structure in which the two soft magnetic layers 8 and 10 sandwich the Ru layer 9, so that the soft magnetic layers 8 and 10 respectively below and above the Ru layer 9 are coupled by AFC (Anti-Ferromagnetic Coupling). Hence, the resistance against external magnetic field, and the resistance against WATE (Wide Area Track Erasure) peculiar to the perpendicular magnetic recording medium can be improved.

The first and second soft magnetic layers 8 and 10 may be made of a CoFe alloy, for example. A high saturation magnetic flux density Bs (1.4 T or higher) can be obtained by using the CoFe alloy for the first and second soft magnetic layers 8 and 10. In addition, an improved recording and reproducing performance can be obtained by using the first underlayer 3 and the second underlayer 4, as will be described later. When depositing the first and second soft magnetic layers 8 and 10, a CoFe alloy layer is preferably sputtered in a state in which a magnetic field is applied in a radial direction of the nonmagnetic substrate 1, in a case in which the perpendicular magnetic recording medium has a disk shape.

The CoFe alloy is preferably added with an element selected from Zr, Ta, and Nb. Noncrystallization of the CoFe alloy is promoted by adding the element to the CoFe alloy, to thereby improve the crystal orientation of the NiW alloy. In addition, an amount of the element selected from Ar, Ta, and Nb and added to the CoFe alloy is preferably in a range of 3 atomic percent (at. %) to 15 at. %, and more preferably in a range of 5 at. % to 10 at. %.

An amount of Fe included within the CoFe alloy is preferably in a range of 5 at. % to 60 at. %. The saturation magnetic flux density Bs of the soft magnetic underlayer 2 becomes low, which is undesirable, in a case in which the Fe-content within the CoFe alloy is less than 5 at. %. On the other hand, the corrosion resistance of the soft magnetic underlayer 2 deteriorates, which is undesirable, in a case in which the Fe-content within the CoFe alloy exceeds 60 at. %.

The soft magnetic underlayer 2 preferably has a thickness in a range of 15 nm to 80 nm, and more preferably in a range of 20 nm to 50 nm. In a case in which the thickness of the soft magnetic underlayer 2 is less than 15 nm, it is difficult to sufficiently absorb the magnetic flux from the magnetic head, and the writing of information becomes insufficient, which are undesirable, because the recording and reproducing performance deteriorates. On the other hand, in a case in which the thickness of the soft magnetic underlayer 2 exceeds 80 nm, it is undesirable in that the productivity of the perpendicular magnetic recording medium considerably deteriorates.

Because the soft magnetic underlayer 2 has the amorphous structure including the first and second soft magnetic layers 8 and 10, it is possible to prevent a surface roughness Ra from becoming excessively large. Accordingly, it becomes possible to reduce a floating amount of the magnetic head from the perpendicular magnetic recording medium, and to further improve the recording density.

In a case in which an index, representing a magnitude of the AFC at the first and second soft magnetic layers 8 and 10 forming the soft magnetic underlayer 2, is defined as "Hbias", the Hbias value for the soft magnetic underlayer 2 is preferably 80 Oe or higher and 300 Oe or lower. The Hbias value in this range can improve the resistance against the external magnetic field and the resistance against the WATE. The Hbias value in an M-H hysteresis curve is defined as an applied magnetic field H at Ms/2, where Ms denotes a saturation magnetization. The Hbis value falls within the above described range when the materials described above are used for the first and second soft magnetic layers 8 and 10, and the thickness of the Ru layer 9 between the first and second soft magnetic layers 8 and 10 is set to a predetermined value (for example, 0.6 nm to 0.8 nm).

Each of the first and second soft magnetic layers 8 and 10 preferably has a coercivity Hc of 10 Oe or lower, and more preferably 5 Oe low lower, where 1 Oe is approximately 79 A/m.

The first underlayer 3 and the second underlayer 4 are provided to control the crystal orientation and the crystal grain size of the intermediate layer 5 and the perpendicular magnetic recording layer 6 that are arranged above the first and second underlayers 3 and 4. In other words, the first and second underlayers 3 and 4 are provided in order to increase a component of the magnetic flux generated from the magnetic head in a direction perpendicular to the substrate surface of the nonmagnetic substrate 1, and to more firmly pin the magnetization direction of the perpendicular magnetic recording layer 6 in which the information is recorded in the direction perpendicular to the substrate surface. This is because the second soft magnetic layer 10 has the amorphous structure, and it is difficult to obtain perpendicular crystal orientation of the magnetic recording layer by simply providing the intermediate layer and the magnetic recording layer on the second soft magnetic layer 10.

By using the NiW alloy for the underlayer, it is possible to grow magnetic grains having the hcp structure with a high c-axis orientation, to form the perpendicular magnetic recording medium as proposed in Japanese Laid-Open Patent Publication No. 2007-179598, for example. The present inventors modified by the underlayer made of the NiW alloy, so as to further improve microcrystallization of the crystal grains of the intermediate layer and the perpendicular magnetic recording layer, uniformity of a grain size distribution of the crystal grains, and the crystal orientation of the crystal grains. More particularly, the present inventors conceived that the microcrystallization of the crystal grains of the perpendicular magnetic recording layer can be improved, the uniformity of the grain size distribution of the crystal grains can be improved, and the crystal orientation of the crystal grains can be improved, by employing a 2-layer structure for the underlayer, including a TiV alloy layer having an amorphous structure, and an NiW alloy layer, that are successively stacked on the soft magnetic underlayer 2.

Conventionally, attempts have been made to microcrystallize the NiW layer, by providing a microcrystal layer having an fcc structure or the like between the soft magnetic underlayer having the amorphous structure and the NiW underlayer. However, when excessive microcrystallization of the NiW layer occurs, the crystal orientation of the intermediate layer formed on the NiW layer deteriorates. According to studies conducted by the present inventors, the excessive microcrystallization deteriorates the crystallinity of the microcrystal layer, to thereby deteriorate the crystallinity of the NiW layer. Accordingly, the present inventors studied providing a layer having an amorphous structure, as an underlayer for the NiW underlayer. The present inventors found that the layer having the amorphous structure preferably forms islands of nuclei, and so that each nucleus causes one by one crystal growth of NiW crystals.

In addition, the present inventors found that the thermal conductivity of the NiW alloy can be improved by adding at least one element selected from a group consisting of Co, Cu, Al, Cr, and Fe to the NiW alloy. The present inventors found that the improved thermal conductivity causes thermal diffusion in a direction towards the substrate when forming the NiW alloy layer, to stabilize the one by one crystal growth of NiW alloy crystals. Hence, in the 2-layer structure for the underlayer conceived by the present inventors, generation of the nuclei of the NiW crystals at the surface of the TiV layer occurs under a delicate balance, and it may be regarded that the one by one crystal growth of the NiW alloy crystals stabilize when the temperature of the NiW crystal grains is reduced to suppress atomic diffusion.

The thermal conductivity of each of Co, Cu, Al, and Cr is higher than that of Ni. Accordingly, it may be regarded that the thermal conductivity of the NiW alloy can be increased by adding one of Co, Cu, Al, and Cr to the NiW alloy. On the other hand, the thermal conductivity of Fe is lower than that of Ni. For this reason, it may also be regarded that the addition of the element, such as Fe, to the NiW alloy does not increase the thermal conductivity of the NiW alloy. However, according to the studies conducted by the present inventors, the addition of Fe to the NiW alloy results in effects similar to those obtained when one of Co, Cu, Al, and Cr is added to the NiW alloy.

The present inventors regard that, the effects similar to those obtained when one of Co, Cu, Al, and Cr is added to the NiW alloy are also obtained when Fe is added to the NiW alloy, because of the following reasons. That is, it is known that the thermal conductivity varies according to the type of material, and also according to the density and the composition of the material. Particularly in the case of a layer formed by an unbalanced process such as sputtering, atomic vacancy and grain boundaries are easily formed inside the layer, and the thermal conductivity of the layer may decrease from a theoretical value. According to the studies conducted by the present inventors, the atomic vacancy and the grain boundaries inside the NiW alloy layer decrease when Fe is added to the NiW alloy, and it may be regarded that this is the reason why the thermal conductivity of the NiW alloy decreases when Fe is added.

An amount of at least one element selected from the group consisting of Co, Cu, Al, Cr, and Fe, added to the NiW alloy, is preferably in a range of 1 at. % to 20 at. %. In a case in which the amount of the at least one element added to the NiW alloy is less than 1 at. %, it is difficult to obtain the effect of increasing the thermal conductivity of the NiW alloy. On the other hand, in a case in which the amount of the at least one element added to the NiW alloy exceeds 20 at. %, it is undesirable in that the crystal orientation of the NiW alloy deteriorates.

In this embodiment, the TiV alloy is used for the first underlayer 3, and an amount of V included within the TiV alloy is preferably in a range of 10 at. % to 80 at. %. In other words, in the case in which the TiV alloy is used for the first underlayer 3, the microcrystallization of the crystal grains and the crystal orientation of the second underlayer 4 made of the NiW alloy can be improved simultaneously, by selecting the amount of V included within the TiV alloy in the range of 10 at. % to 80 at. %.

A lower limit of the amount of V included within the TiV alloy is preferably 10 at. % or greater, and more preferably 30 at. % or greater. In addition, an upper limit of the amount of V included within the TiV alloy is preferably 80 at. % or less, and more preferably 70 at. % or less.

The first underlayer 3 in this embodiment can be formed by the TiV alloy layer having the amorphous structure, by employing a known method. For example, in a case in which the first underlayer 3 is formed by sputtering, the known method may perform one of reducing the substrate temperature at the time of sputter-deposition, reducing energy of sputtering particles, reducing input power to a target to reduce a plasma density, reverse sputtering after the sputter-deposition to distort the crystal structure of the like, or the like.

By improving the crystal composition of the second underlayer 4 made of the NiW alloy, it is possible to further improve the microcrystallization of the crystal grains of the intermediate layer 5 and the perpendicular magnetic recording layer 6, the uniformity of the grain size distribution of the crystal grains, and the crystal orientation of the crystal grains. As a result, the perpendicular magnetic recording medium has a good electromagnetic conversion characteristic, and can cope with the demands to further increase the recording density.

The first underlayer 3 preferably has a thickness in a range of 0.2 nm to 5 nm. In a case in which the thickness of the first underlayer 3 is less than 0.2 nm, the effects obtainable in this embodiment become insufficient, and the effects of improving the microcrystallization of the crystal grains and the uniformity of the grain size distribution of the crystal grains of the second underlayer 4 made of the NiW alloy deteriorate. On the other hand, in a case in which the thickness of the first underlayer 3 exceeds 5 nm, it is undesirable in that the crystal grain size of the second underlayer 4 becomes large.

In this embodiment, the NiW alloy is used for the second underlayer 4. An amount of W included within the NiW alloy is preferably in a range of 3 at. % to 10 at. %. In a case in which the amount of W included within the NiW is less than 3 at. % or exceeds 10 at. %, the effects of controlling the crystal orientation and the crystal grain size of the perpendicular magnetic recording medium deteriorate.

The second underlayer 4 preferably has a thickness in a range of 2 nm to 20 nm. In a case in which the thickness of the second underlayer 4 is less than 2 nm, the effects of improving the microcrystallization of the crystal grains and the crystal orientation cannot be obtained. On the other hand, in a case in which the thickness of the second underlayer 4 exceeds 20 nm, it is undesirable in that the crystal grain size becomes large.

The intermediate layer 5 is provided for causing the perpendicular magnetic recording layer 6 to have the columnar crystal structure having the c-axis orientation. Crystal growth of the intermediate layer 5 results in a surface that is grown to have columnar crystals with dome-shaped tops. The intermediate layer 5 having the columnar crystal structure can be formed using Ru or an Ru alloy. Examples of the Ru alloy may include RuCo alloys, RuAl alloys, RuMn alloys, RuMo alloys, RuFe alloys, or the like, for example. An amount of Ru included within the Ru alloy is preferably in a range of 50 at. % to 80 at. %.

In addition, the intermediate layer 5 preferably has a thickness of 30 nm or less, preferably 16 nm or less, and more preferably 5 nm or less. By making the intermediate layer 5 thin, a distance between the magnetic head and the soft magnetic underlayer 2 becomes short, and the magnetic flux from the magnetic head can be made sharp. As a result, the thickness of the soft magnetic underlayer 2 can further be reduced, to thereby improve the productivity of the perpendicular magnetic recording medium.

The perpendicular magnetic recording layer 6 is made of a magnetic layer in which the axis of easy magnetization is oriented in the perpendicular direction with respect to the substrate surface. The perpendicular magnetic recording layer 6 is made of a material at least including Co and Pt, and this material may additionally include an oxide or elements such as Cr, B, Cu, Ta, Zr, or the like for the purposes of further improving an SNR (Signal-to-Noise Ratio). Examples of the oxide may include $SiO_2$, SiO, $Cr_2O_3$, CoO, $Ta_2O3$, $TiO_2$, or the like.

An amount of the oxide included within the material forming the perpendicular magnetic recording layer 6 is preferably in a range of 15 volume percent (vol. %) to 40 vol. %, and more preferably in a range of 25 vol. % to 35 vol. %. In a case in which the amount of oxide is less than 15 vol. %, the SNR deteriorates. On the other hand, in a case in which the amount of oxide exceeds 40 vol. %, it is undesirable in that a coercivity sufficient to cope with the high-density recording cannot be obtained.

The perpendicular magnetic recording layer 6 preferably has a thickness in a range of 6 nm to 20 nm. For example, in a case in which a thickness of an oxide granular layer is within this range, a sufficiently high output can be obtained from the magnetic head, and an OW (Over-Write) performance does not deteriorate.

The perpendicular magnetic recording layer 6 may have a single-layer structure, or a multi-layer structure. The multi-layer structure of the perpendicular magnetic recording layer 6 may include 2 or more magnetic layers made of different materials or made of different compositions.

The protection layer 7 is provided to prevent corrosion of the perpendicular magnetic recording layer 6, and to prevent damage to the medium surface when the magnetic head makes contact with the perpendicular magnetic recording medium. Known materials may be used for the protection layer 7. Examples of the known materials used for the protection layer 7 may include C, $SiO_2$, $ZrO_2$, or the like, for example. From a viewpoint of high-density recording, the protection layer 7 preferably has a thickness in a range of 1 nm to 5 nm, because the distance between the magnetic head and the medium surface can be made short.

The lubricant layer coated on the protection layer 7 may be made of a known material, such as perfluoropolyether, fluorinated alcohol, fluorinated carboxylic acid, or the like, for example.

[Magnetic Storage Apparatus]

Figure 2:
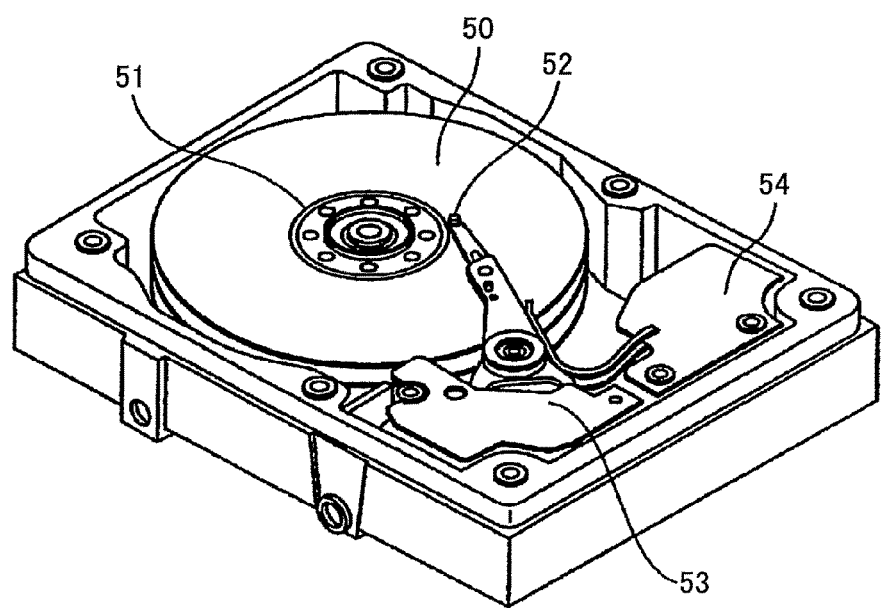
FIG. 2 is a perspective view illustrating an example of a magnetic storage apparatus in one embodiment of the present invention.

FIG. 2 is a perspective view illustrating an example of a magnetic storage apparatus in one embodiment of the present invention.

A magnetic storage apparatus illustrated in FIG. 2 includes at least one perpendicular magnetic recording medium 50 having the structure illustrated in FIG. 1, a medium driving part 51 that drives and rotates the perpendicular magnetic recording medium 50, a magnetic head 52, a head driving part 53 that drives the magnetic head 52 to move relative to and above the perpendicular magnetic recording medium 50, and a signal processing part 54. The magnetic head 52 writes (or records) information on and reads (or reproduces) the information from the perpendicular magnetic recording medium 50. The signal processing part 54 processes input data into recording signals to be recorded on the perpendicular magnetic recording medium 50, and supplies the recording signals to the magnetic head 52. The signal processing part 54 also processes signals read from the perpendicular magnetic recording medium 50 by the magnetic head 52 into reproduced signals to be output from the magnetic storage apparatus.

Of course, two or more perpendicular magnetic recording media 50 may be provided in the magnetic storage apparatus. In this case, a number of magnetic heads 52 is determined according to the number of perpendicular magnetic recording media 50 are provided in the magnetic storage apparatus.

In the magnetic storage apparatus applied with the perpendicular magnetic recording medium of the embodiment described above, the magnetic head 52 may be a single-pole head having a high write performance with respect to the perpendicular magnetic recording layer 6, in order to cope with the demands to further improve the recording density of the perpendicular magnetic recording medium. On the other hand, in the perpendicular magnetic recording medium, the soft magnetic underlayer 2 is provided between the nonmagnetic substrate 1 and the perpendicular magnetic recording layer 6 in order to cope with the single-pole head and improve the efficiency with which the magnetic flux is input and output between the single-pole head and the perpendicular magnetic recording layer 6.

Furthermore, in the magnetic storage apparatus, the magnetic head 52 may be a head that uses, as a reproducing element, a GMR (Giant Magneto-Resistive) element utilizing the GMR effect, and is suited for the high-density recording.

The present invention is not limited to the embodiments described above, and various variations and modifications may be made without departing from the scope of the present invention.

For example, the present invention may be applied to a perpendicular magnetic recording medium having magnetic recording patterns that are magnetically isolated, in the perpendicular magnetic recording layer 6. More particularly, the perpendicular magnetic recording medium may be a so-called patterned medium having magnetic recording patterns that are arranged with a predetermined rule for every 1 bit. In addition, the perpendicular magnetic recording medium may be a medium in which the magnetic recording patterns are arranged in tracks, or a medium in which the magnetic recording patterns are servo signal patterns, or the like.

[Exemplary Implementations]

Next, a description will be given of exemplary implementations of the present invention. The present invention is not limited to the exemplary implementations described below, and various variations and modifications may be made without departing from the scope of the present invention.

The perpendicular magnetic recording medium illustrated in FIG. 1 is manufactured in the following manner according to one exemplary implementation of the present invention.

First, a glass substrate having an outer diameter of 2.5 inches is prepared as the nonmagnetic substrate. The glass substrate is accommodated within a deposition chamber of a DC magnetron sputtering apparatus (C-3010 manufactured by Canon Anelva Corporation, for example), and the chamber is decompressed to a vacuum of $1 \times 10^{-5}$ Pa. Next, the bonding layer made of 50Cr-50Ti (Cr-content of 50 at. %, Ti-content of 50 at. %) is deposited on the glass substrate to a thickness of 10 nm. Further, the first soft magnetic layer made of 47Fe-35Co-9W-9-Nb (Fe-content of 47 at. %, Co-content of 35 at. %, W-content of 9 at. %, Nb-content of 9 at. %) is deposited on the bonding layer to a thickness of 20 nm, the Ru layer is deposited to a thickness of 0.8 nm, and the second soft magnetic layer made of 47Fe-35Co-9W-9Nb is deposited on the Ru layer to a thickness of 20 nm, to form the soft magnetic underlayer. The amorphous structure of the soft magnetic layers was confirmed by XRD (X-Ray Diffraction).

Next, the first underlayer having the composition and crystal structure illustrated in Table 1 is deposited on the soft magnetic underlayer to a thickness of 1 nm. In addition, the second underlayer made of the NiW alloy having the composition and crystal structure illustrated in Table 1 is deposited on the first underlayer to a thickness of 3 nm. In comparison examples cmp1, cmp13, and cmp14, a bias voltage of 150 V was applied on the substrate when sputtering the first underlayer, to crystallize the first underlayer.

Next, the intermediate layer made of Ru is deposited on the second underlayer to a thickness of 12 nm. In addition, a first magnetic layer of 69Co-5Cr-16Pt-10SiO$_2$ is deposited on the intermediate layer to a thickness of 10 nm, and a layer of 53Co-10Cr-23Pt-14B is deposited on the first magnetic layer to a thickness of 6 nm, to form the perpendicular magnetic recording layer.

The protection layer made of carbon is formed on the perpendicular magnetic recording layer to a thickness of 4 nm, by ion beam deposition. Thereafter, the lubricant layer made of perfluoropolyether is formed on the protection layer by dipping.

As a result, the comparison examples cmp1 through cmp12 of the perpendicular magnetic recording medium, and exemplary implementations emb1 through emb12 of the perpendicular magnetic recording medium, were obtained.

The SNR of these perpendicular magnetic recording media were evaluated, in order to inspect the electromagnetic conversion characteristic of these perpendicular magnetic recording media. The evaluation results of these perpendicular magnetic recording media are also illustrated in Table 1. Table 1 illustrates the composition and the crystal structure of the first underlayer, and the composition of the second underlayer, for each of the comparison examples cmp1 through cmp12 and the exemplary implementations emb1 through emb12. In addition, Table 1 illustrates a perpendicular orientation Δθ50 (°) of the intermediate layer made of Ru, and the electromagnetic conversion characteristic in terms of the SNR (dB), for each of the comparison examples cmp1 through cmp12 and the exemplary implementations emb1 through emb12. The perpendicular orientation Δθ50 (°) of the intermediate layer made of Ru was inspected by extracting the substrate deposited with the Ru intermediate layer from the DC magnetron sputtering apparatus.

TABLE 1

|  | First Underlayer | | Second Underlayer Composition | Ru Δθ50 (°) | Electromagnetic Conversion Characteristic (SNR (dB)) |
| --- | --- | --- | --- | --- | --- |
|  | Composition | Crystal Structure |  |  |  |
| cmp1 | Ti | hcp | 96Ni4W | 2.85 | 19.10 |
| cmp2 | Ti | Amorphous | 96Ni4W | 2.77 | 19.30 |
| cmp3 | 95Ti5V | Amorphous | 96Ni4W | 2.76 | 19.50 |
| cmp4 | 90Ti10V | Amorphous | 96Ni4W | 2.74 | 19.52 |

TABLE 1-continued

| | First Underlayer | | Second Underlayer Composition | Ru Δθ50 (°) | Electromagnetic Conversion Characteristic (SNR (dB)) |
| | Composition | Crystal Structure | | | |
|---|---|---|---|---|---|
| cmp5 | 82Ti18V | Amorphous | 96Ni4W | 2.73 | 19.52 |
| cmp6 | 70Ti30V | Amorphous | 96Ni4W | 2.71 | 19.53 |
| cmp7 | 60Ti40V | Amorphous | 96Ni4W | 2.70 | 19.54 |
| cmp8 | 50Ti50V | Amorphous | 96Ni4W | 2.70 | 19.55 |
| cmp9 | 35Ti65V | Amorphous | 96Ni4W | 2.72 | 19.54 |
| cmp10 | 25Ti70V | Amorphous | 96Ni4W | 2.72 | 19.53 |
| cmp11 | 20Ti80V | Amorphous | 96Ni4W | 2.75 | 19.51 |
| cmp12 | 10Ti90V | Amorphous | 96Ni4W | 2.76 | 19.48 |
| cmp13 | V | bcc | 96Ni4W | 2.89 | 19.02 |
| cmp14 | 82Ti18V | bcc | 96Ni4W | 2.83 | 19.23 |
| emb1 | 50Ti50V | Amorphous | 94Ni4W2Co | 2.69 | 19.57 |
| emb2 | 50Ti50V | Amorphous | 94Ni4W2Cu | 2.69 | 19.57 |
| emb3 | 50Ti50V | Amorphous | 94Ni4W2Al | 2.69 | 19.56 |
| emb4 | 50Ti50V | Amorphous | 94Ni4W2Cr | 2.69 | 19.56 |
| emb5 | 50Ti50V | Amorphous | 94Ni4W2Fe | 2.69 | 19.56 |
| emb6 | 50Ti50V | Amorphous | 88Ni4W8Co | 2.67 | 19.58 |
| emb7 | 50Ti50V | Amorphous | 88Ni4W8Cu | 2.67 | 19.58 |
| emb8 | 50Ti50V | Amorphous | 88Ni4W8Al | 2.68 | 19.57 |
| emb9 | 50Ti50V | Amorphous | 90Ni4W6Cr | 2.68 | 19.57 |
| emb10 | 50Ti50V | Amorphous | 86Ni4W10Co | 2.69 | 19.57 |
| emb11 | 50Ti50V | Amorphous | 80Ni4W16Fe | 2.68 | 19.57 |
| emb12 | 50Ti50V | Amorphous | 82Ni4W14Cu | 2.69 | 19.57 |
| emb13 | 50Ti50V | Amorphous | 82Ni4W14Al | 2.69 | 19.56 |
| emb14 | 50Ti50V | Amorphous | 86Ni4W10Cr | 2.69 | 19.56 |

According to the embodiments and exemplary implementations described above, it is possible to provide a perpendicular magnetic recording medium having an underlayer made of an NiW alloy, capable of reducing a crystal grain size of the underlayer and improving a crystal orientation of the underlayer, and a magnetic storage apparatus having such a perpendicular magnetic recording medium. In addition, the underlayer made of the NiW alloy is suited for use on an underlayer made of a TiV alloy having an amorphous structure. The provision of the underlayer can improve the microcrystallization of the crystal grains of the intermediate layer and the perpendicular magnetic recording layer, the uniformity of the grain size distribution of the crystal grains, and the crystal orientation of the crystal grains. Hence, it is possible to obtain a perpendicular magnetic recording medium having a good electromagnetic conversion characteristic and a high recording density.

What is claimed is:

1. A perpendicular magnetic recording medium comprising:
a soft magnetic underlayer, an underlayer, an intermediate layer, and a perpendicular magnetic recording layer successively stacked on a nonmagnetic substrate,
wherein the soft magnetic underlayer includes a soft magnetic layer having an amorphous structure,
wherein the underlayer includes a first underlayer, and a second underlayer provided between the first underlayer and the intermediate layer,
wherein the first underlayer is made of a TiV alloy having an amorphous structure,
wherein the second underlayer is made of an NiW alloy including at least one element selected from a group consisting of Co, Cu, Cr, and Fe,
wherein the intermediate layer is made of Ru or an Ru alloy, and wherein the soft magnetic layer, the first underlayer, and the second underlayer are stacked in this order.

2. The perpendicular magnetic recording medium as claimed in claim 1, wherein an amount of V included within the TiV alloy is in a range of 10 atomic percent to 80 atomic percent.

3. The perpendicular magnetic recording medium as claimed in claim 2, wherein an amount of the at least one element added to the NiW alloy is in a range of 1 atomic percent to 20 atomic percent.

4. The perpendicular magnetic recording medium as claimed in claim 1, wherein an amount of the at least one element added to the NiW alloy is in a range of 1 atomic percent to 20 atomic percent.

5. The perpendicular magnetic recording medium as claimed in claim 4, wherein the first underlayer has a thickness in a range of 0.2 nm to 5 nm.

6. The perpendicular magnetic recording medium as claimed in claim 1, wherein the first underlayer has a thickness in a range of 0.2 nm to 5 nm.

7. The perpendicular magnetic recording medium as claimed in claim 2, wherein the first underlayer has a thickness in a range of 0.2 nm to 5 nm.

8. The perpendicular magnetic recording medium as claimed in claim 3, wherein the first underlayer has a thickness in a range of 0.2 nm to 5 nm.

9. A magnetic storage apparatus comprising:
a perpendicular magnetic recording medium that includes a soft magnetic underlayer, an underlayer, an intermediate layer, and a perpendicular magnetic recording layer successively stacked on a nonmagnetic substrate, wherein
the soft magnetic underlayer includes a soft magnetic layer having an amorphous structure,
he underlayer includes a first underlayer, and a second underlayer provided between the first underlayer and the intermediate layer,
the first underlayer is made of a TiV alloy having an amorphous structure, the second underlayer is made of an NiW alloy including at least one element selected from a group consisting of Co, Cu, Cr, and Fe, the intermediate layer is made of Ru or an Ru alloy, and the soft magnetic layer, the first underlayer, and the second underlayer are stacked in this order; and a magnetic head configured to read and write information with respect to the perpendicular magnetic layer of the perpendicular magnetic recording medium.

10. The magnetic storage apparatus as claimed in claim 9, wherein an amount of V included within the TiV alloy of the first underlayer of the perpendicular magnetic recording medium is in a range of 10 atomic percent to 80 atomic percent.

11. The magnetic storage apparatus as claimed in claim 9, wherein an amount of the at least one element added to the NiW alloy of the second underlayer of the perpendicular magnetic recording medium is in a range of 1 atomic percent to 20 atomic percent.

12. The magnetic storage apparatus as claimed in claim 9, wherein the first underlayer of the perpendicular magnetic recording medium has a thickness in a range of 0.2 nm to 5 nm.

13. The magnetic storage apparatus as claimed in claim 9, wherein the magnetic head is a single-pole head.

14. The perpendicular magnetic recording medium as claimed in claim 1, wherein the second underlayer is made of the NiW alloy further including Al.

15. The magnetic storage apparatus as claimed in claim 9, wherein the the second underlayer of the perpendicular magnetic recording medium is made of the NiW alloy further including Al.

* * * * *